(12) United States Patent
Xue et al.

(10) Patent No.: US 6,398,039 B1
(45) Date of Patent: Jun. 4, 2002

(54) HIGH EFFICIENT ACID-GAS-REMOVING WICKING FIBER FILTERS

(75) Inventors: Lixin Xue, Morristown; Ronald Rohrbach, Flemington; Daniel Bause, Morristown; Peter Unger, Convent Station; Russell Dondero, N. Arlington, all of NJ (US); Gordon Jones, Toledo, OH (US)

(73) Assignee: AlliedSignal Inc., Norristown, NJ (US)

( * ) Notice: Subject to any disclaimer, the term of this patent is extended or adjusted under 35 U.S.C. 154(b) by 0 days.

(21) Appl. No.: 08/957,211

(22) Filed: Oct. 24, 1997

Related U.S. Application Data

(63) Continuation-in-part of application No. 08/757,984, filed on Nov. 27, 1996, now Pat. No. 5,759,394.

(51) Int. Cl.[7] .......................... B01D 39/04; B01D 39/08
(52) U.S. Cl. .............................. 210/504; 95/211; 96/10; 96/154; 210/506; 210/508; 261/104; 261/107; 264/177.13; 264/177.14; 428/368; 428/372
(58) Field of Search ................................ 210/264, 506, 210/504, 508, 502.1; 96/10, 154; 428/368, 372; 264/210.6, 177.13, 177.14; 95/211; 261/104, 107

(56) References Cited

U.S. PATENT DOCUMENTS

| | | |
|---|---|---|
| 4,255,487 A * | 3/1981 | Sanders |
| 5,069,970 A | 12/1991 | Largman et al. |
| 5,344,626 A * | 9/1994 | Abler |
| 5,704,966 A | 1/1998 | Rohrbach et al. |
| 5,713,971 A * | 2/1998 | Rohrbach et al. |
| 5,744,236 A | 4/1998 | Rohrbach et al. |
| 5,891,221 A | 4/1999 | Rohrbach et al. |
| 5,902,384 A | 5/1999 | Rohrbach et al. |

* cited by examiner

*Primary Examiner*—Matthew O. Savage
*Assistant Examiner*—Michael A. Fleming

(57) ABSTRACT

An unique filtration device (10) which removes acidic contaminants such as H2S and SO2 from a fluid stream through the use of partially hollow wicking fibers (20) impregnated with an effective amount of alkaline-generating chemical compounds, preferably also containing an effective amount of a compound with elements from Group II and Group 6-12 in +2 oxidation state, and most preferably also containing an effective amount of solid fine particles (18). A nonwoven filter mat (12) is formed from a plurality of the elongated fibers (20) each having at least one internal channel (22) connected to the fiber outer surface via an elongated opening (24). The fluid stream containing the acidic gas phase contaminants is directed over the nonwoven filter mat (12) whereby said plurality of small solid particles (18) and reservoir of active chemical reagents disposed in the open channels (22) communicate through the elongated opening (24) with the fluid flow path and absorbs the acidic gas phase contaminants.

20 Claims, 16 Drawing Sheets

HIGH EFFICIENT ACID-GAS-REMOVING WICKING FIBER FILTERS

CROSS-REFERENCES TO RELATED APPLICATIONS

This application is a continuation-in-part of U.S. patent application Ser. No. 08/757,984, filed Nov. 27, 1996, now U.S. Pat. No. 5,759,394.

Related applications include U.S. patent application Ser. No. 08/736,308, filed Nov. 24, 1996, now U.S. Pat. No. 5,713,971, which is a continuation of U.S. patent application Ser. No. 08/363,500, filed Dec. 23, 1994, now abandoned.

BACKGROUND OF THE INVENTION

1. Field of the Invention

This invention relates to an air cleaning system and more particularly to an effective odor removal system using chemisorptive reagents impregnated within shaped wicking fibers to remove acidic gases.

2. Description of Prior Art

It is known in the prior art to use activated charcoal or a zeolite material as an adsorptive odor removing element or media to purify an air stream. U.S. Pat. No. 4,130,487 shows a filter for liquid or gases which includes activated carbon for removing odors during air filtration. The activated carbon is in an additional layer which is added to the filter material.

In the prior art fibers have had surface coatings ranging from finely divided powder particles to coarse granular particles. The particles have been applied by either an adhesive coating which mechanically retains the particles on the fiber or the powder particles have been embedded on the fiber surface during the tacky stage in the polymer processing.

It is known to use carbon fibers for filter applications. The carbon fibers are formed from organic polymer fibers which are heated and carbonized. The carbon fiber can also be formed by heating polymer fibers and attaching carbon particles when the polymer is sticky or by using an adhesive to hold the carbon particles to a fiber. The ability to coat various powdered particulate material on a surface of a fiber has generally required an adhesive layer to be used to immobilize and hold the powder particles on the fiber surface. The very act of using an adhesive layer to hold the particles results in a portion of the surface of the powder particles being contaminated by the adhesive and therefore becoming ineffective for applications such as filtration. A balance has to be met between the strength of the immobilization versus the maintaining of effectiveness of the powder layer.

In order to minimize this contamination typically larger particles are often used so that the point of contact between the surface adhesive and powder particles is small. In typical gaseous applications using activated carbon the particles used are most frequently 100 microns and larger; and, finely powdered activated carbon is basically only used in liquid decolorization applications despite the fact that fine powder activated carbon holds the potential of much more rapid kinetics.

It is desirable to provide a compact, economical air filter for the continuous removal of H2S and SO2 which avoids the problems of reduced flow rates and reduced removal efficiency over time.

SUMMARY OF THE INVENTION

The present invention provides a filter wherein either alkali-generating chemical reagents, or in conjunction with solid particles, such as an activated carbon powder, are impregnated in the internal cavities of the shaped fibers in a fiber filter mat without the use of an adhesive. Undesirable H2S and SO2 gas molecules are removed from the air stream by reacting with the chemical reagents composed of alkaline compounds of Group 1 metals such as KOH, K2CO3, KHCO3 or K3PO4. and divalent compounds of Group 2 (i.e. $Mg^{2+}$) and Group 6-12 ( i.e. $Zn^{2+}$ and $Cu^{2+}$) elements.

This invention demonstrates that the chemical reagent packages described as above has a high affinity for the removal of acidic gases such as H2S, SO2 when impregnated into the internal channels of the shaped wicking fiber even without the presence of any additional solid powders in the systems. This invention also demonstrates that the presence of solid particles in the systems greatly increases the gas removing activity by creating better reagent retaining spaces and larger reaction surface areas for better reaction kinetics.

The fibers have longitudinal extending internal cavities which have openings extending to the outer surface of the fibers. The fiber, the opening size and the particles to be included are selected so that when the particles are forced into the longitudinal cavities they are permanently retained. The fibers selected provide a way to mechanically immobilize powdered activated carbon adsorbent particles without the use of an adhesive. The small solid particles becomes mechanically trapped within the longitudinal cavities of the fibers and is basically irreversible bound. This approach can be extended to any powder which one would like to include within a fiber medium, including such agents as zeolites, baking soda, cyclodextrins or any number of other solid particle of interest.

This invention provides flexible fibers, each having a cross section with internal cavities having openings leading to the surface of the fiber, which are impregnated with solid particles. The internal cavities extend longitudinal along the lengthwise direction of the fiber and they are filled with a solid particulate material which is permanently retained in the cavities and will not spill out through the openings due, we believe, to mechanical restrictions. The fibers are dusted with the solid particles and then rolled, forcing the particles into the fiber cavities. The excess particles are physically removed by agitation and a strong air flow. The particles entrapped in the cavities are surprisingly stable and resistant to physical action. The present invention should have a significant cost savings over carbon fibers and should outperform fibers coated with granular activated carbon.

The longitudinal extending opens inside the solid-particle-impregnated wicking fibers permits the chemical reagents retained in the cavities to interact with the gas molecules within the air stream effectively so as to absorb the unwanted gas molecules. In the disclosed device the open space between the wicking fibers remain so that, in the air stream to be cleaned, the pressure differential problem is minimized and air flow restrictions are not increased by continuous use.

BRIEF DESCRIPTION OF THE DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
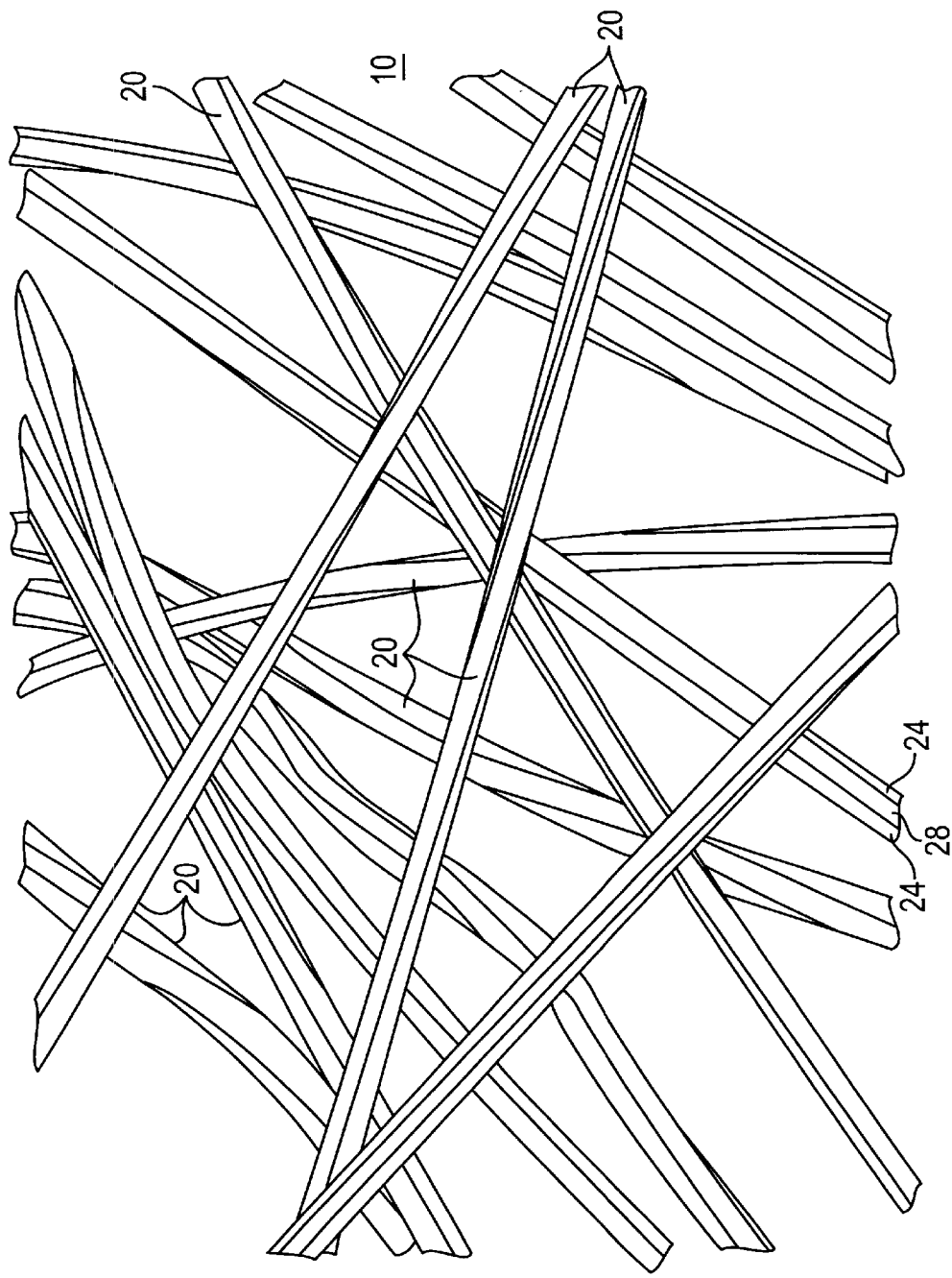
FIG. 1 is an illustration of a portion of a nonwoven fiber mat utilizing wicking fibers which can be impregnated with active chemical reagents and solid particles according to the present invention.
Figure 2A:
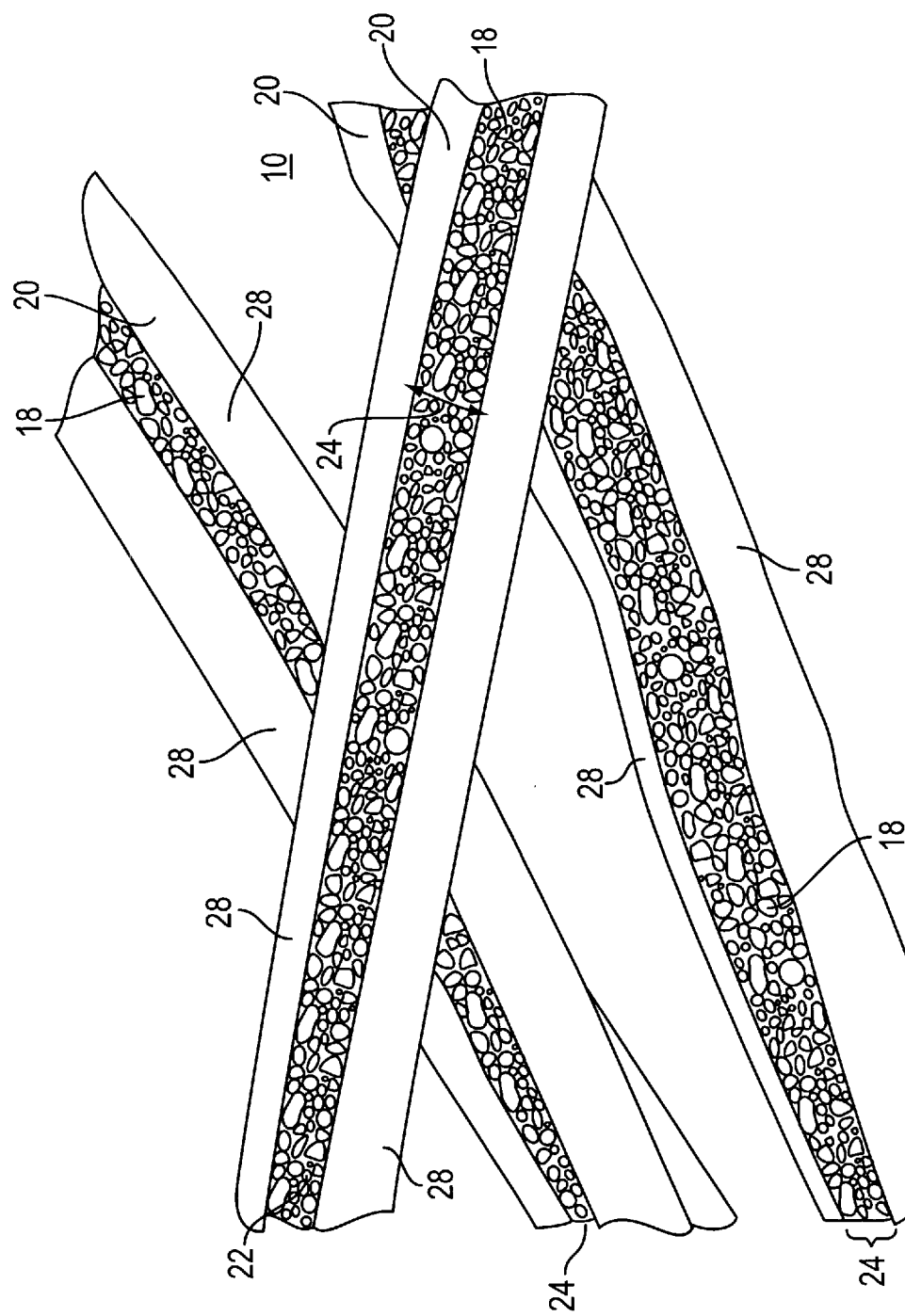
FIG. 2A is an enlarger view of a portion of the fiber mat shown in FIG. 1 utilizing wicking fibers containing small solid which can be used in practicing the present invention.
Figures 2B, 2C, 2D, 2E:
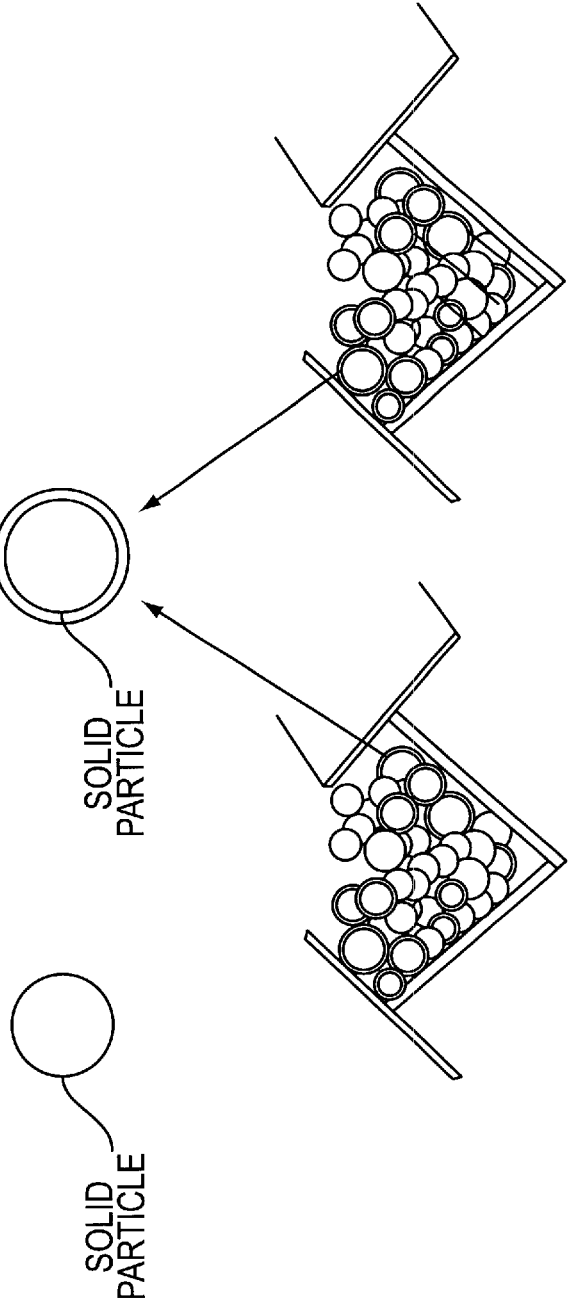
FIGS. 2B–E are a schematic illustration of four types of reagent impregnation in an enlarged view of a portion of the shaped wicking fiber in the fiber mat as shown in FIG. 1 with type (a) having solid particles only, with type (b) having liquid chemical reagent only, with type (c) having reagent only on the surface of solid particles, and with the preferred embodiment type (d) having impregnated wicking fibers entrapping solid particles and a liquid chemical reagent reservoir.
Figure 4:
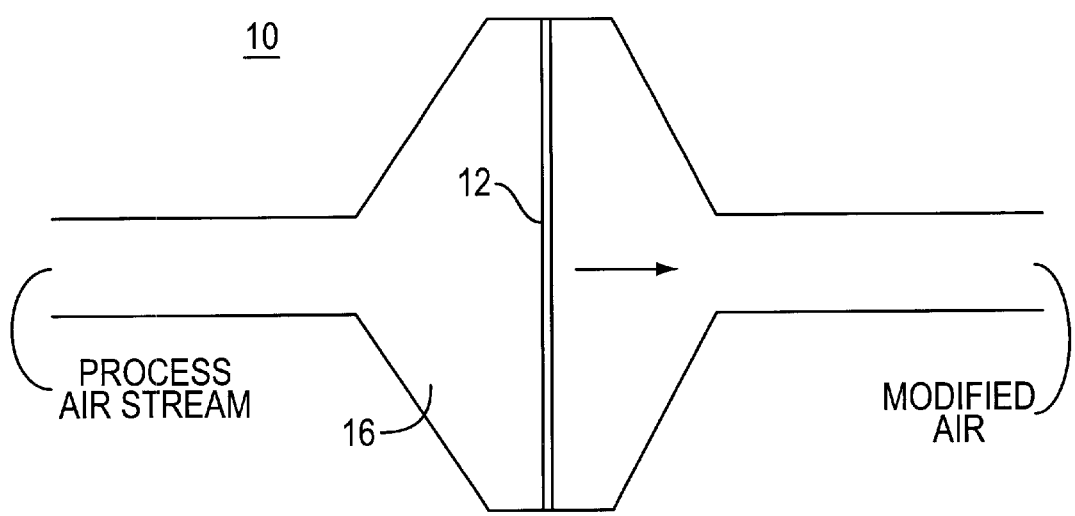
FIG. 4 is an illustration of an air filter system using a filter fiber mat as shown in FIG. 2.1 according to the present invention.

Referring now to FIG. 4 of the drawings there is shown a gas molecule capturing and removal system 10 according to the present invention. Gas removal system 10 utilizes a filter element 12 formed from numerous wicking fibers 20, as shown in FIGS. 1 and 2, impregnated, as shown in FIGS. 2B–2C, for absorbing H2S and SO2 gas molecule. Filter element 12 is disposed across a chamber 16 through which an air stream, containing H2S and SO2 molecules to be removed, is directed.

Figure 3:
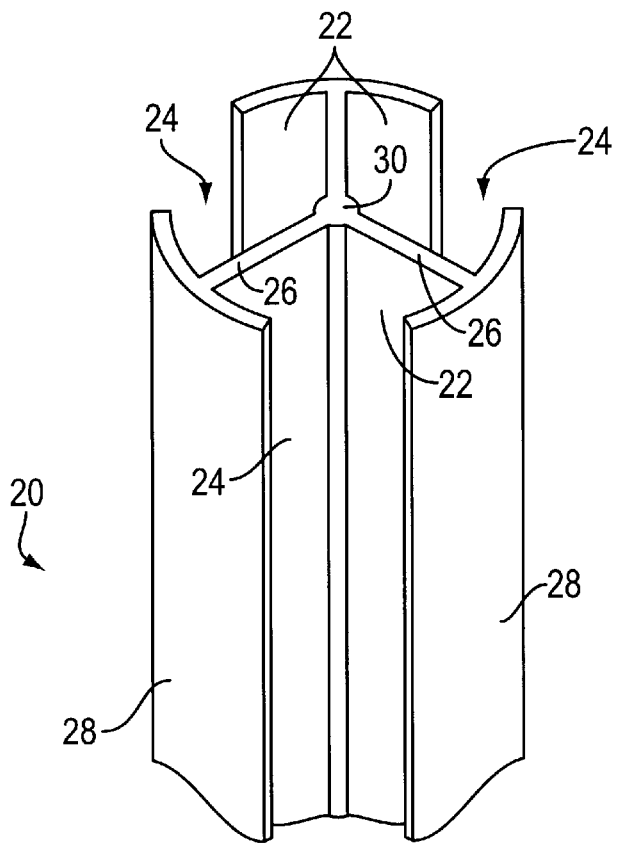
FIG. 3 is a perspective view showing a fiber which is suitable for practicing the present invention.

A generally hollow fiber 20 which is suitable for practicing this invention is disclosed in U.S. Pat. No. 5,057,368 and is shown in FIG. 3. This patent discloses a trilobal or quadrilobal fiber formed from thermoplastic polymers wherein the fiber has a cross-section with a central core and three or four T-shaped lobes 26. The legs of the lobes intersect at the core 30 so that the angle between the legs of adjacent lobes is from about 80 degrees to 130 degrees. The thermoplastic polymer is typically a polyamide, a polyester, a polyolefin or a combination thereof. The fiber 20 as illustrated in FIG. 3 is formed as an extruded strand having three hollow interior longitudinally extending cavities 22 each of which communicates with the outer strand surface by way of longitudinal extending slots 24 which are defined between the outer ends of the T-shaped lobes. Referring now to the drawings and FIGS. 1 and 2 in particular there is shown a fiber mat 10 formed from a plurality of flexible fibers 20. The flexible fibers 20 are formed into the nonwoven fiber mat 10 which can be used as a filter. The filter mat 10 and fibers 20 may be made of one or more types of material such as polyamides, polyesters, or polyolefins. The three T-shaped cross-section segments 26 may have their outer surface 28 curved, as shown, or the outer surface may also be straight. While the fiber 20 is depicted as three lobed other number of lobes are suitable. In addition other internal cavity fibers with C-shapes or other cross sections may also be suitable for retaining the small particles 18 provided the opening from the cavity is sized to retain the particles 18 within the fiber interior.

The removal of toxic, corrosive and odorous gases is a key strategy in improving air quality in any closed space, such as a vehicle cabin or cockpit. In the copending application (Ser. No. 08/757,984), we have demonstrated that the shaped fibers 20 described above provided a way to mechanically immobilize solid powder particles into their internal channels 22 without the use of any adhesive. We have been developing wicking or shaped fiber 20 filters 12 impregnated with various solid powders such as carbon, alumina, zeolite, zinc oxide, PTE, and sodium bicarbonate for cabin air quality improvement in the relatively low in resident time situations. The filters thus made, type (a) as shown in FIG. 2B, include various forms of solid absorbent particles 18 such as carbon powder, usually do not show adequate reaction capacity or kinetics to absorb the target gases like SO2 or H2S in a very short reaction time situation which is present in many applications such as cabin air filtration and gas masks.

Figure 5A:
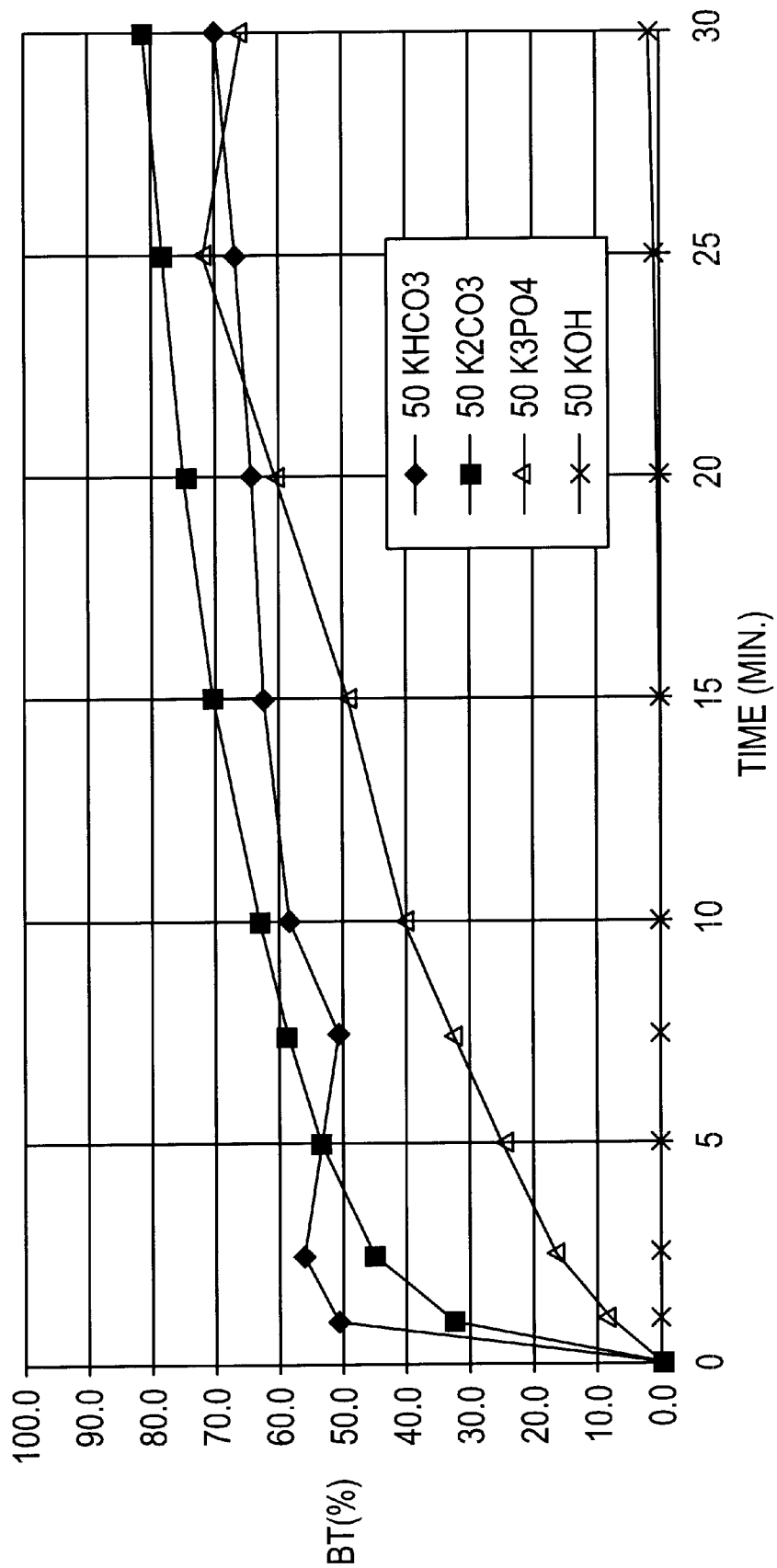
FIG. 5A is a graph showing H2S breakthrough results for trilobal wicking fiber mats impregnated with 50% solutions of KOH, K3PO4, K2CO3, and KHCO3 without solid particles and which were freshly prepared.
Figure 5B:
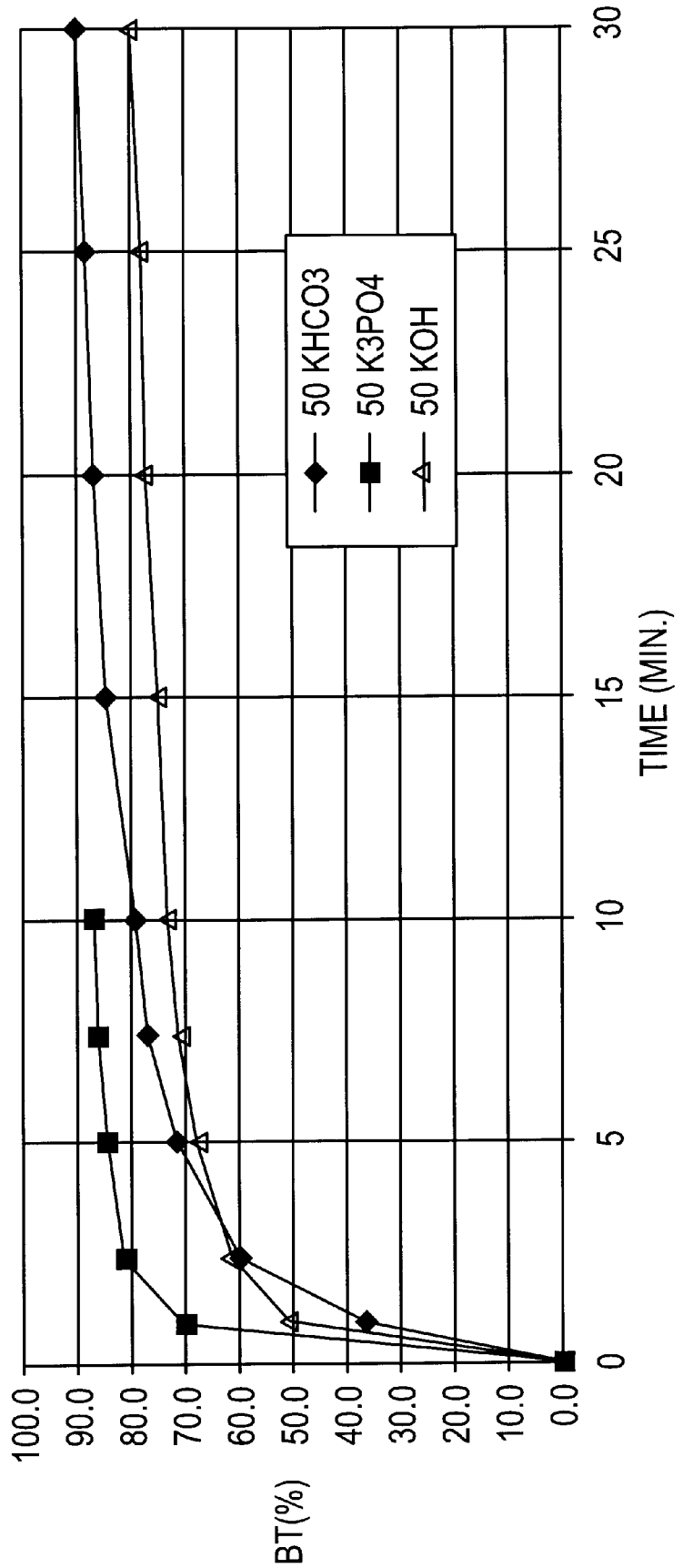
FIG. 5B is a graph showing H2S breakthrough results for trilobal wicking fiber mats impregnated with 50% solutions of KOH, K3PO4, and KHCO3 without solid particles and which were equilibrated in 50%RH overnight.

The internal channels 22 of the shaped fibers 20 described above are also, suitable for retaining liquid or half-liquid/solid active chemical reagents, as shown in FIG. 2C, to form type (b) filters. In this invention, targeting acidic gases such as H2S and SO2, solutions of alkaline compounds such as KOH, K3PO4, K2CO3, and KHCO3 were first impregnated into the channels 22 of the shaped fibers 20 for air quality improvement purposes. The loading of the solutions are controlled so that most of the reagent solutions is retained inside the channels of the fibers and the amount of solution between the fibers are negligible. As shown in FIG. 5A, the freshly prepared filters thus made demonstrated various activity to H2S gases depending on their alkalinity. The filters with 50% KOH solution removed 98% or more of 400 ppb H2S in the 30 mins testing period. After stored in air at 50% relative humidity overnight, the reagents in the fibers 20 are saturated with CO2 in the atmosphere, but they still maintained reasonable activity to H2S gas as shown in FIG. 5B. This suggests that the choice of compounds in this invention can be any compounds which provide alkalinity when equilibrated in air. They may be but are not limited to be Group 1 metal hydroxides, phosphates, monohydrogen phosphates, pyrophosphates, meta-phosphates, carbonates, bicarbonates, and/or borate.

Figure 6:
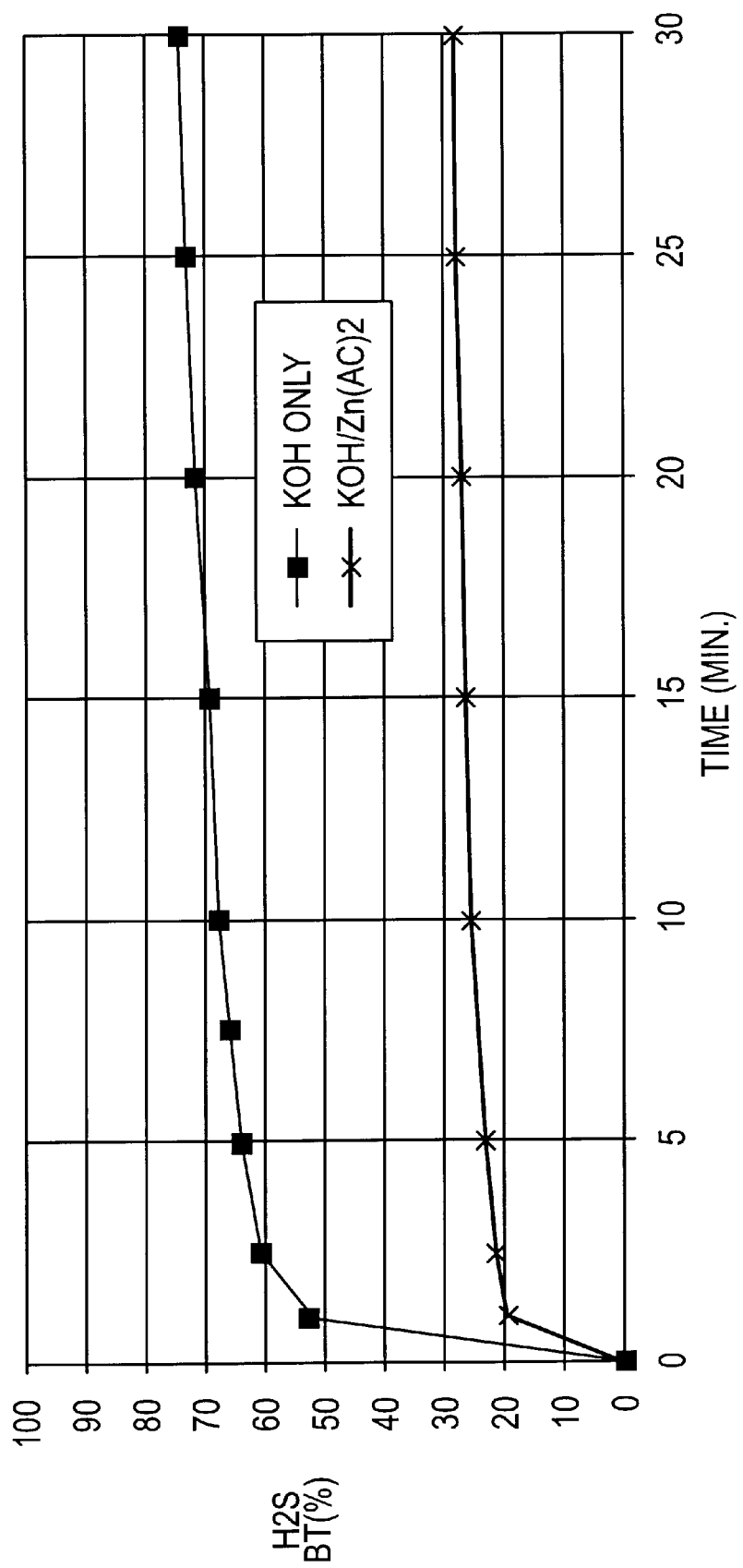
FIG. 6 is a graph showing the effect of Zn(OAc)2 treatment on H2S breakthrough results for KOH impregnated equilibrated wicking fiber filters.
Figure 7:
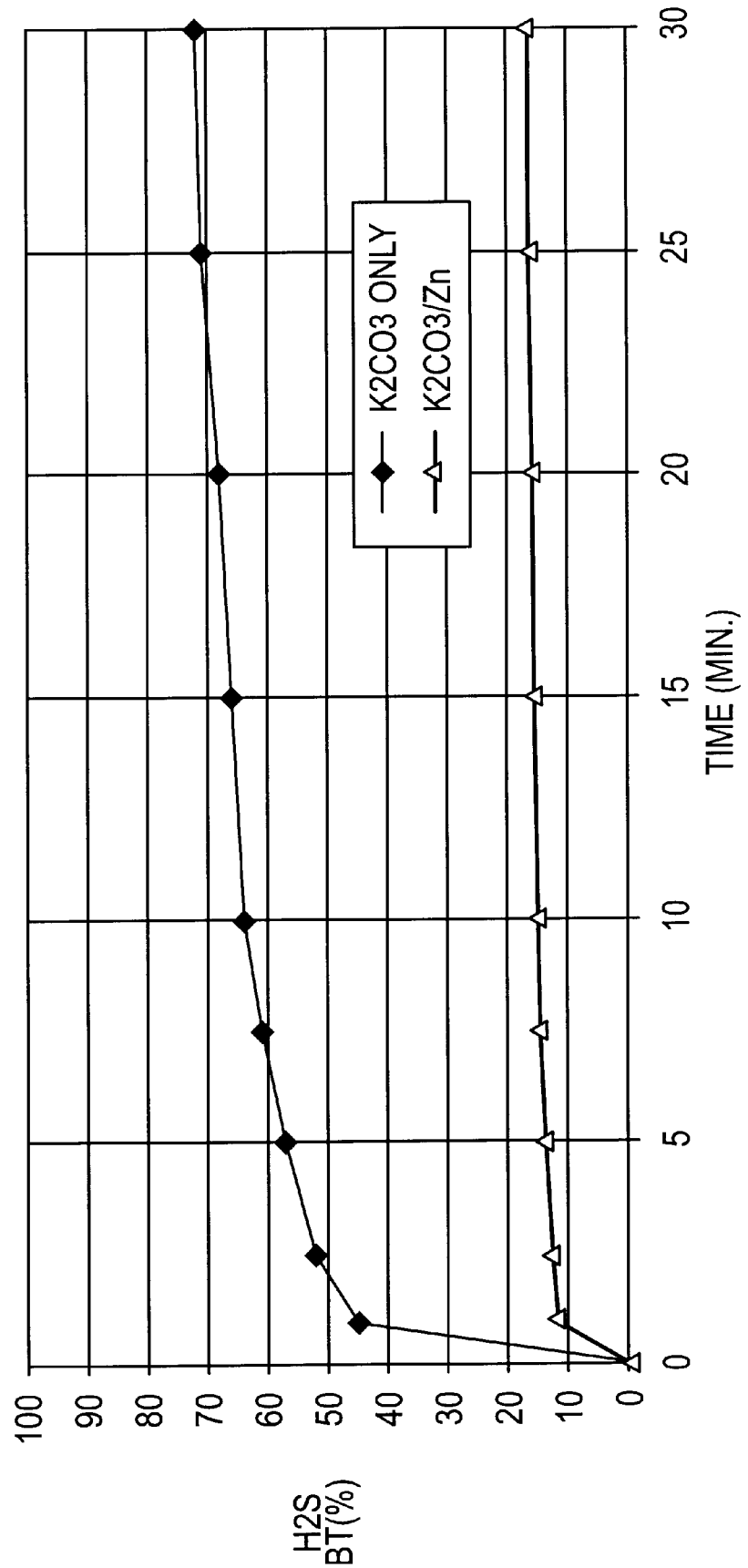
FIG. 7 is a graph showing the effect of Zn(OAc)2 treatment on H2S breakthrough results for K2CO3 impregnated equilibrated wicking fiber filers.
Figure 11:
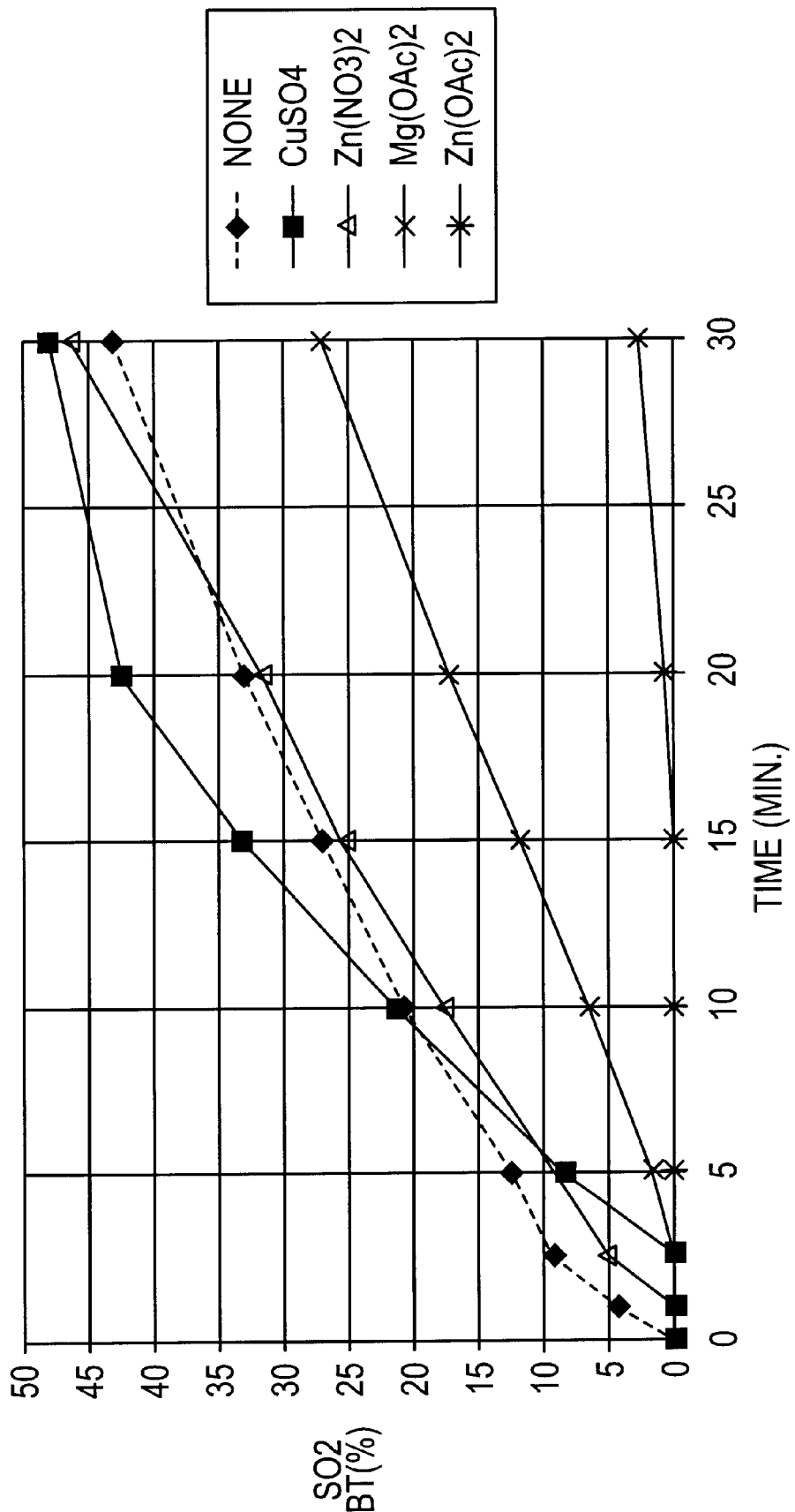
FIG. 11 is a graph showing the effects of divalent metal salts on SO2 breakthrough results of K2CO3/Carbon impregnated wicking fiber filters.
Figure 12A:
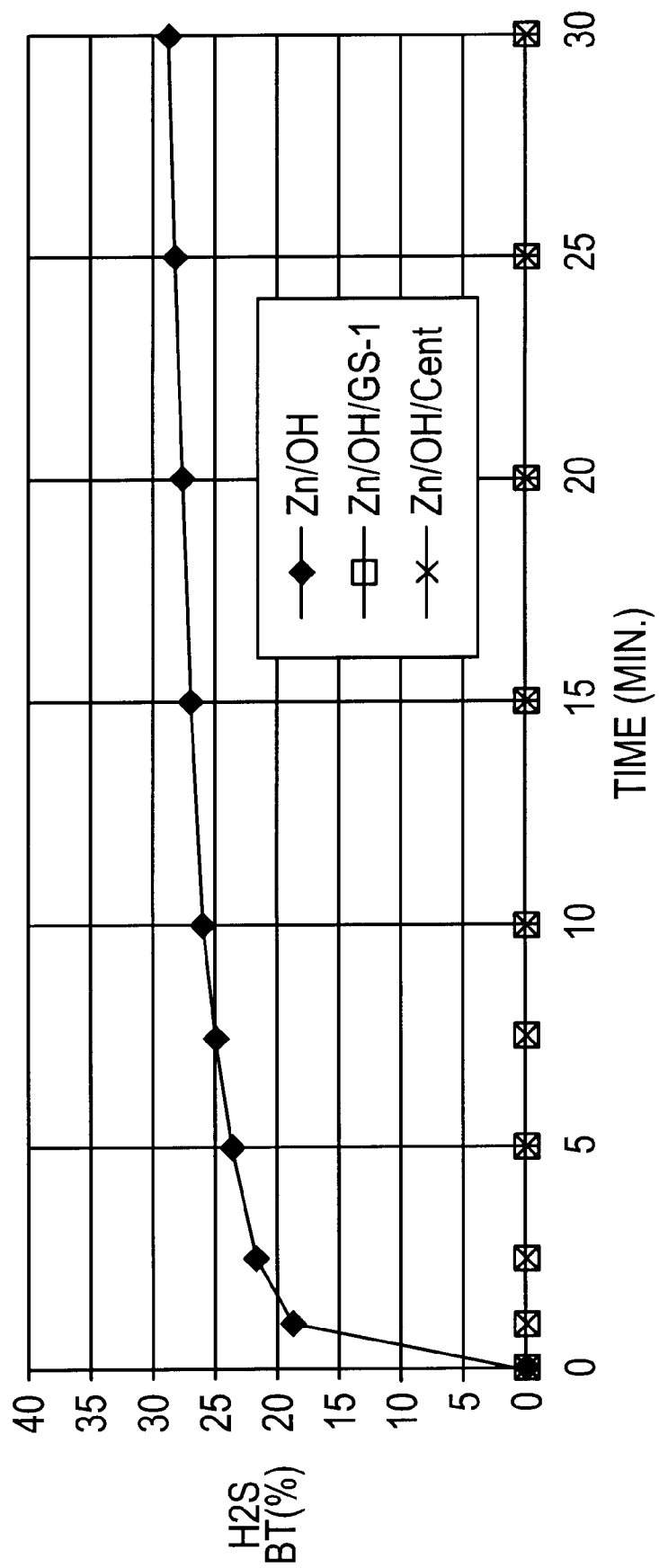
FIG. 12A is a graph showing the effects on H2S breakthrough results of incorporating carbon powder in KOH/Zn(OAc)2 impregnated equilibrated wicking fiber filers.
Figure 12B:
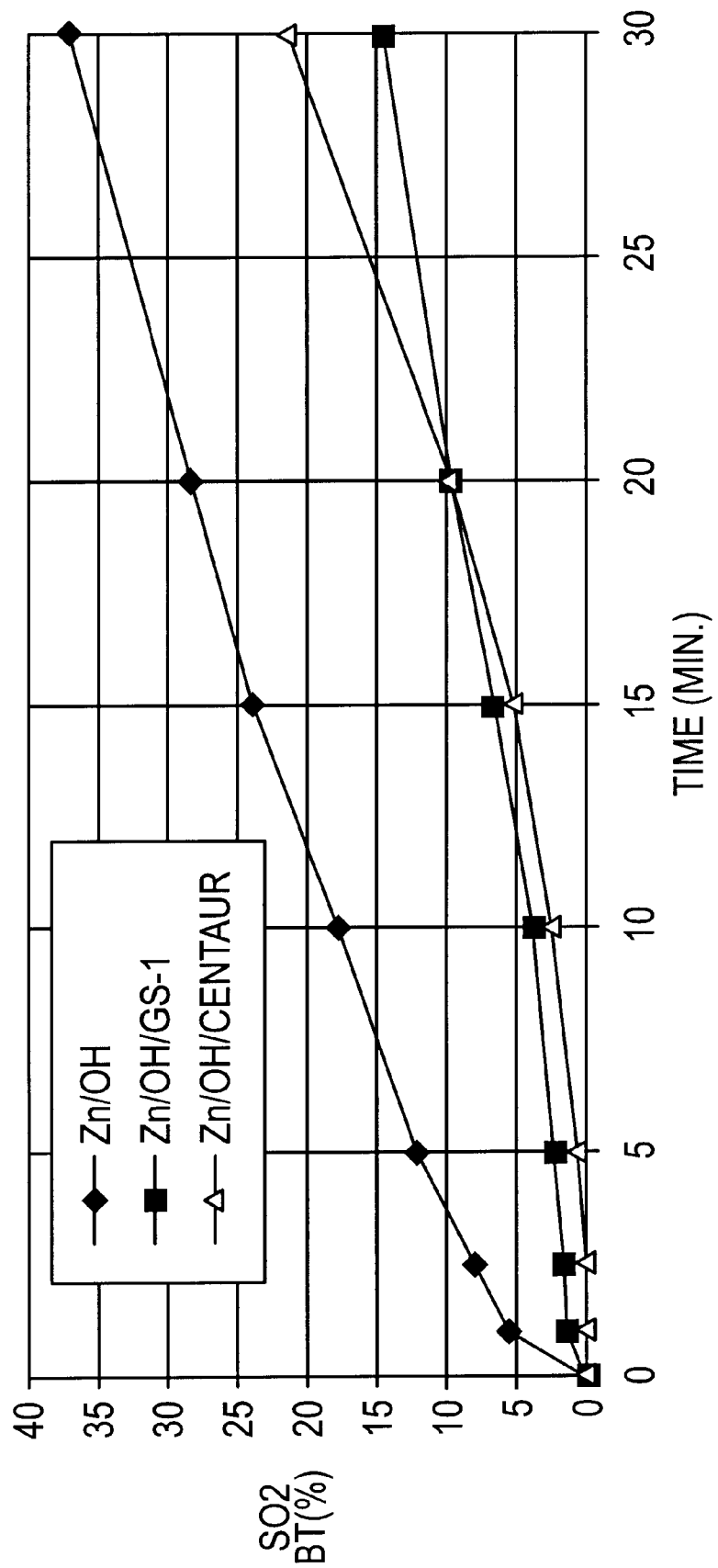
FIG. 12B is a graph showing the effects on SO2 breakthrough results of incorporating carbon powder in KOH/Zn(OAc)2 impregnated equilibrated wicking fiber filers.
Figure 14:
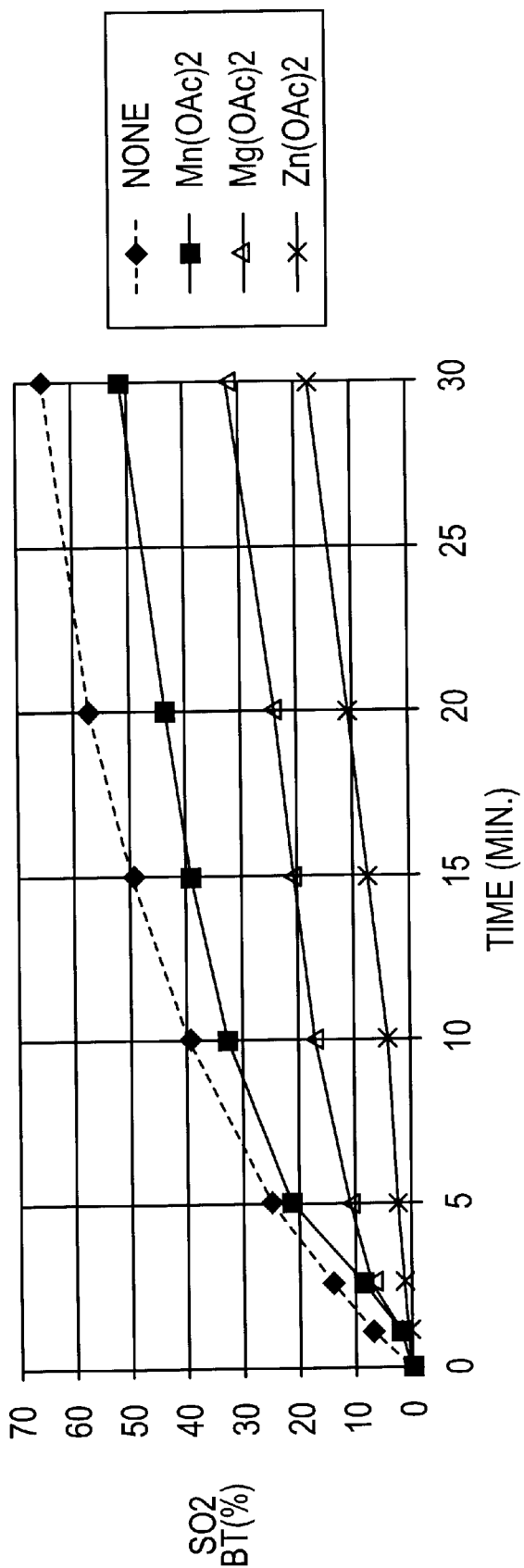
FIG. 14 is a graph showing the effects of divalent salts on the SO2 removing performance of K2CO3/Carbon impregnated trilobal wicking fiber filters.

From FIGS. 5A and 5B, the negative effects of storage in the 50% RH air to the reactivity of the reagents to $H_2S$ is obvious especially in the case of using KOH. As shown in FIG. 6 and FIG. 7, incorporation of divalent metal salts such as $Zn(OAc)_2$ in the system greatly enhanced the gas removing performance of either KOH or $K_2CO_3$ reagents in this systems when equilibrated in the ambient condition. This enhancement is due to, we believe, the formation of favorable complexed chemical structures for releasing alkalinity or sulfur-capturing anions. As shown in FIGS. 11 and 14, similar enhancement is also observed for $SO_2$ removal when compounds containing Zn(II), Mg(II), or Cu(II) were incorporated into the $K_2CO_3$ and carbon power impregnated shaped fiber filters 12. The divalent salts suitable for this application can be, but are not limited to be, of organic or inorganic compounds containing Group 2 and/or Group 6-12 elements in +2 oxidation state.

Figure 9:
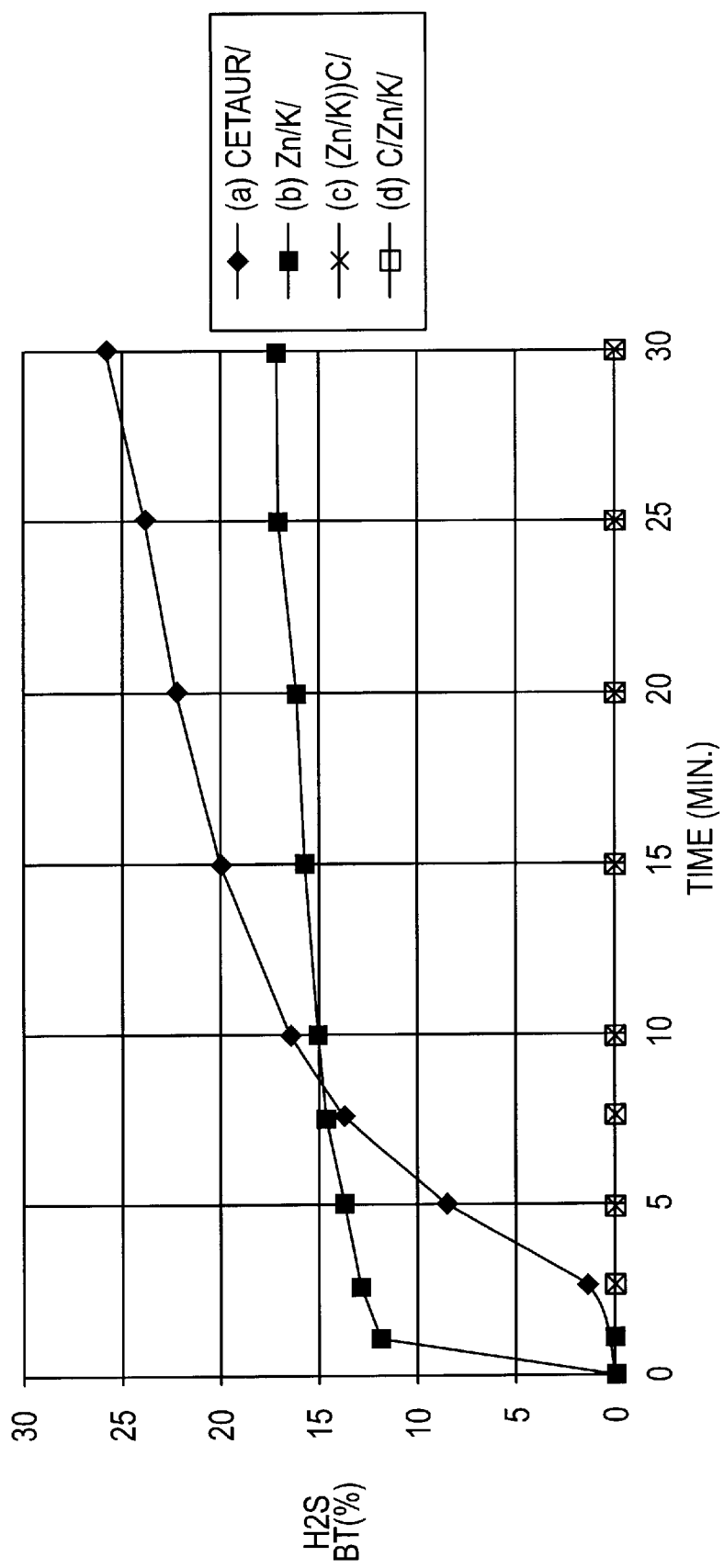
FIG. 9 is a graph showing examples of H2S removing performance of the four types of impregnated wicking fiber systems illustrated in FIG. 2.1.
Figure 13:
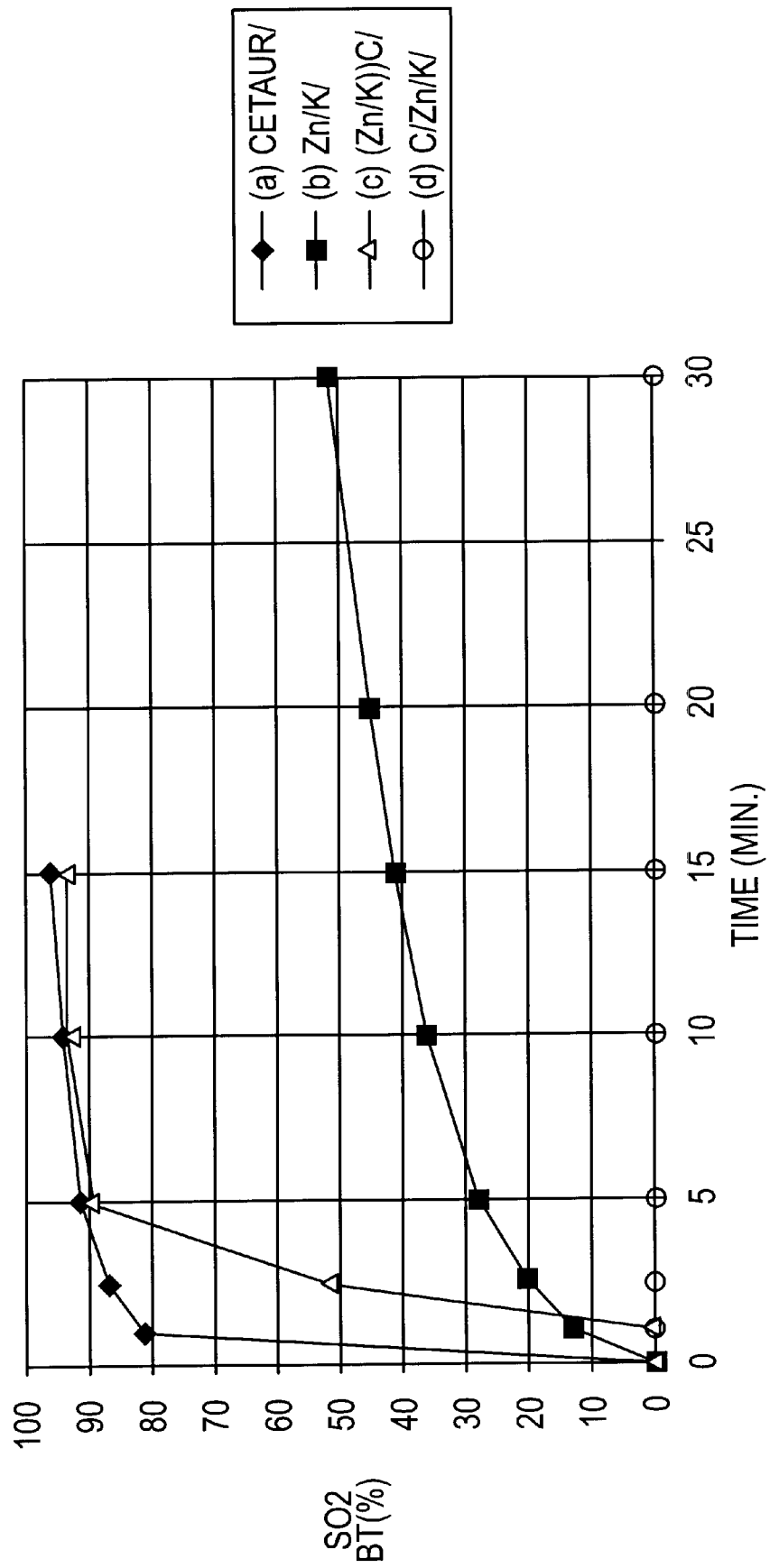
FIG. 13 is a graph showing examples of SO2 removing performance of the four types of impregnated wicking fiber systems shown in FIGS. 2B–E.

As shown in the schematic model in FIG. 2C, the reaction kinetics of type (b) filters with only chemical reagents in the fiber inner cavities 22 may be limited by the relative flatness of the gas contacting surface although the chemical reagents incorporated may possess very high capacity to the target gases. To increase the gas contacting area of the chemical reagents, the reagents may be first coated on the surfaces of solid fine particles using the procedure described in U.S. Pat. No. 5,496,785 and then impregnated into the shaped fibers 20 to form a type (c) filter fiber as shown in FIG. 2D. As shown in FIG. 13, graph item (a), the application of this formed type (c) filters are greatly limited by their low reagent capacity. In the example, the dry weight of chemical reagents the carbon powder surfaces could carry was about 15 wt % of the dried weight of carbon which equals to about 3 wt % of the weight of the virgin fiber media. From FIG. 13, this type of filter clearly present very good reaction kinetics before the capacity was used up (in the first 1–2 mins under 40 ppm $SO_2$), so it can be very useful for situations with lower challenging levels. Actually, as shown in FIG. 9, type (c) filter fibers have excellent performance to remove 400 ppb of $H_2S$ under the same flow rate (almost no breakthrough until 30 mins). Other types of commercially available alkaline chemical reagent treated carbon powders such as calgon IVP, chromium, or copper carbon powder have also been impregnated and shown similar property which are disclosed in the copending patent application (Ser. No. 08/757,984).

FIG. 9 show examples of $H_2S$ removing performance of the four types of shaped wicking fiber impregnation systems demonstrated in FIG. 2B–2E: type (a) Centaur—solid carbon powder only; type (b) $K_2CO_3/Zn(OAc)_2$—liquid reagent only; type (c) Centaur carbon powder activated with $K_2CO_3/Zn(oAc)_2$ reagent—carbon powder particles treated with chemical reagent before impregnation; and type (d) Centaur carbon powder impregnated wicking fiber entrapping liquid $K_2CO_3$ and any divalent salts—carbon powder particles and chemical reagent package reservoir retained in the open channels 22.

FIG. 13 shows examples of $SO_2$ removing performance of the four types of shaped wicking fiber impregnation systems illustrated in FIG. 2B–2E: type (a) Centaur—solid carbon powder powder; type (b) $K_2CO_3/Zn(OAc)_2$—liquid reagent only; type (c) Centaur carbon powder activated with $K_2CO_3/Zn(oAc)_2$ reagent—carbon powder particles treated with chemical reagent before impregnation; and type (d) Centaur powder impregnated wicking fibers entrapping liquid $K_2CO_3/Zn$ reagent—carbon powder particles and chemical reagent package reservoir retained in the open channels 22.

Figure 8:
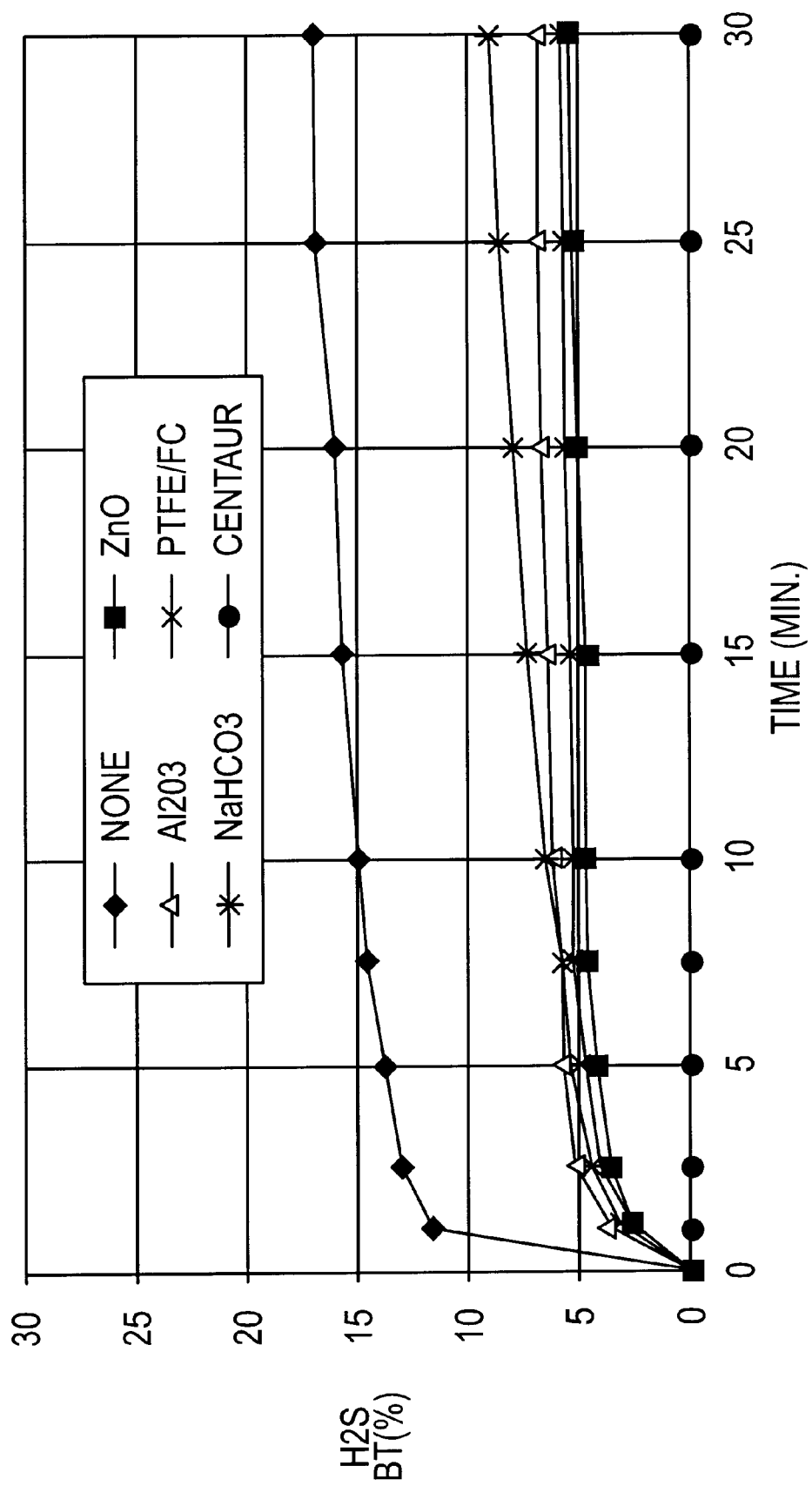
FIG. 8 is a graph showing the improved effects on H2S breakthrough results from including various solid particles in K2CO3/Zn impregnated wicking fiber filters.
Figure 10:
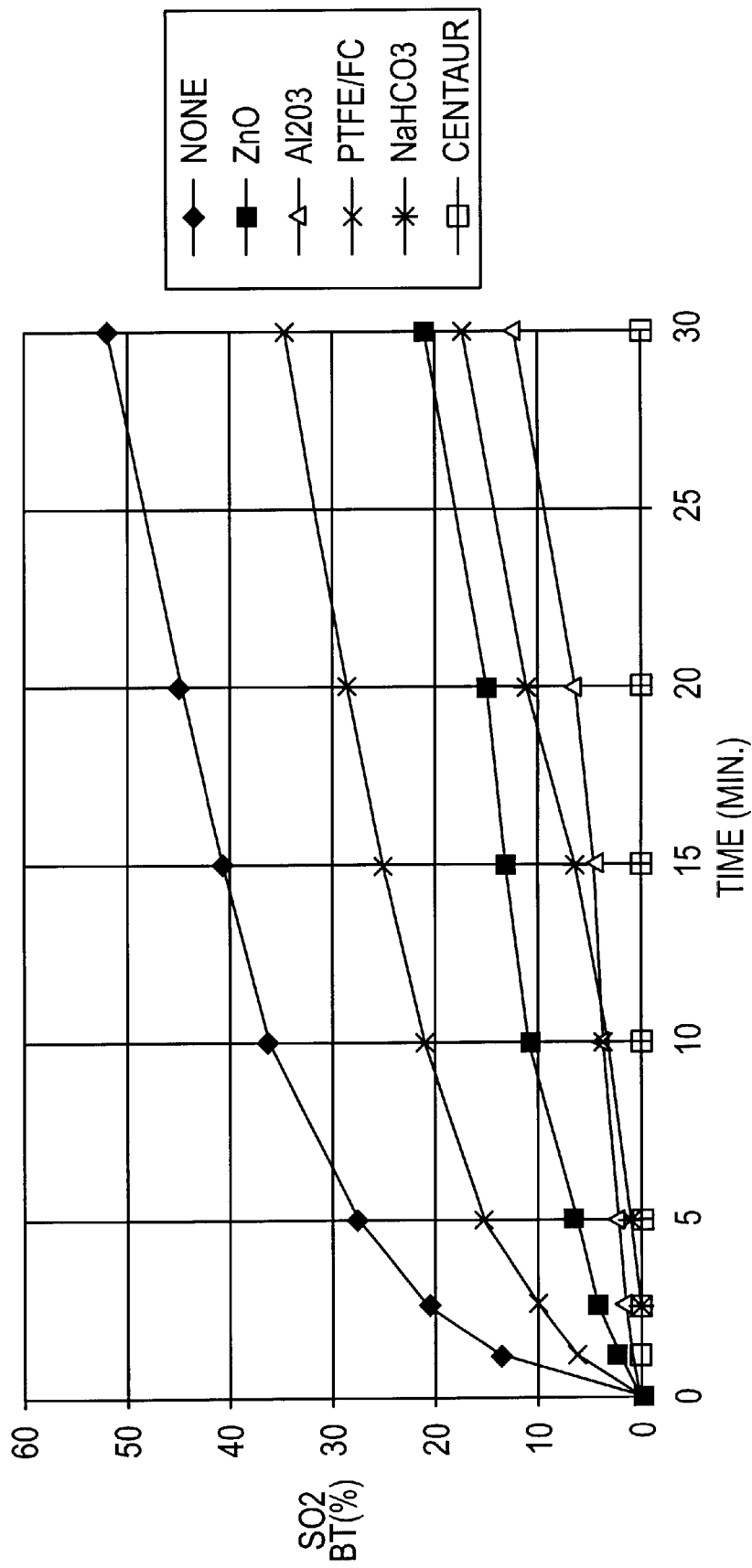
FIG. 10 is a graph showing the improved effect on SO2 breakthrough results from including various solid particles in K2CO3/Zn(OAc)2 impregnated wicking fiber filters.

The most preferred filters of this invention is the type (d) fiber with the carbon powder particles 18 and the chemical reagent package reservoir retained in the open channels 22, as shown in FIG. 2E, which was formed by first impregnating solid fine particles 18 into the wicking fibers as shown in co-pending application (Ser. No. 08/757,984), followed by the applications of active chemical reagents described in this invention. In this way, the active chemical reagents can not only spread on all the surfaces of the fine power particles 18 to increase gas reaction surfaces similar to type (c), but also be excessively stored in part of the internal spaces as a reservoir for high gas removing capacity similar to type (b). As shown in FIG. 8 and FIG. 10, type (d) filter fibers thus made using solid fine particles 18 of carbon, zinc oxide, alumina, PTFE treated with FC-94 surfactants, or bicarbonate which is used in fire extinguisher containing silicates all demonstrated excellent performance in removing both 400 ppb of $H_2S$ and especially 40 ppm of $SO_2$ in the testing situations with very short residence time.

As defined in the co-pending application, the solid particles 18 suitable for the application can be of any organic or inorganic sources including carbon, zeolites, baking soda, cyclodextrins or any number of other solid particle of interest. They are dry impregnated into the fiber mat 10. Each fiber 20 includes an internal cavity 22 within which are disposed the small particles 18. A longitudinal opening 24 extends from each cavity 22 to the surface of each fiber 20. The multilobal fibers 20 are relatively small having a diameter of 250 microns to 10 microns or smaller. The fibers shown in FIGS. 1 and 2 are approximately 30 microns in diameter. The size of opening 24 is selected (approximately 10 microns) so when particles 18 are disposed in cavity 22, as shown in FIGS. 2A–2E, they are mechanically entrapped and remain within the fiber cavities 22 and generally do not enter the space between the fibers 20; thus, creating ideal space inside the wicking fiber with longitudinal openings 24 to entrap active reagents, as shown in FIG. 2E, which communicate effectively with the air stream flowing past the generally hollow fibers 20 during a filtering application. The solid particles 18 are around 1 to 2 microns across and smaller. The retained weight of the solid particles 18 may be (but is not limited to be) 10–40 wt % and most preferably 10–25 wt % of the virgin fiber mat in the case using –400 mesh centaur powders. The retained weight of solid powders made of other materials may varied with their density to match the volume of the space in the cavity 22.

The method of impregnating chemical reagents into the fiber mat in this invention can be varied as long as an effective amount of alkaline generating compound are present in the cavities of the fiber. Preferably, an effective amount of divalent salts, which can be $Zn(OAc)_2$, are present with the alkaline generating compounds, which may be $K_2CO_3$ or KOH, in the fiber channels, and most preferably an effective amount of solid particles are also incorporated with the chemical reagent packages. By "an effective amount" is meant an amount sufficient to show effects on the removal of the targeted gasses in the air stream, which may be $H_2S$ or $SO_2$. The chemical impregnation processes are preferably, but are not limited to be, carried out in sequence, first with a solution containing divalent salt(s) and then with a solution containing monovalent alkaline compound(s). The solutions may be applied to by any possible ways such as soaking, spraying, and/or mechanical squeezing. The excess reagent solutions that may exist in-between the fibers during each step of treating may be cleared by methods such as appropriate mechanical squeezing, or drying with heat and/or gas stream blowing of the fiber mat. In the most favored cases, besides water and other possible components, 1.0 g of virgin fiber mat may entrap 0.10–0.15 g wt of $Zn(Ac)_2$ in solid and 0.20–0.50 g wt of $K_2CO_3$ in solid, while 1.0 g of virgin fiber containing about 0.16 g of centaur carbon powder (−400 mesh) may entrap 0.30–0.60 g wt of Zn(Ac)2 in solid and 0.80–1.20 g wt of K2CO3 in solid after the impregnation. The alkaline compounds, divalent salts and solid powders may be applied step-by-step in any order or at the same times, and in any combined forms such as solution, solid powder, suspensions and/or colloids, as long as an effective acidic gas removing system are obtained with the shaped fibers.

The method of operation and the apparatus of this invention should now be very clear. Undesirable air borne acidic gas contaminants such as H2S and SO2 are removed from an air stream by interposing a plurality of at least partially hollow wicking fibers 20 in the air stream. The hollow portions 22 of the wicking fibers are impregnated with an effective amount of alkaline-generating chemical compounds, preferably also containing an effective amount of compound with elements from Group II and Group 6-12 in +2 oxidation state, and most preferably also containing an effective amount of solid fine particles 18, to form high efficient acidic gas removing filters. Following are some examples which furhter illustrate the present invention

EXAMPLES

TEST APPARATUS—Several laboratory scale test stands were used to permit simultaneous analyses of the test gases. The test stands were constructed of stainless and/or PTFE tubing connected by the appropriate stainless steel fittings and valves. All tests were done at ambient room temperature. The compressed air was humidified to 50±5% relative humidity (RH), and concentrated forms of the test gases were introduced into the humidified air stream via flow meters to yield the desired challenge concentrations. The challenge concentration for the diluted $H_2S$ and $SO_2$ were introduced at a flow rate of 11.5 m/min. and concentrations of 400 ppb and 40 ppm, respectively. The sources of the H2S, and $SO_2$ were compressed gas cylinders containing 100, and 200 ppm, respectively, with concentrations certified by Liquid Carbonics, Inc. The gas filter pad to be tested was secured by an in-house designed holder, and the filter could be tested in either a flat sheet or pleated configuration. Outlet ports on the filter holder were connected to a differential pressure meter, which measured the pressure drop across the filter in inches of water. The circular flat filter pad for testing had an outside diameter of 5.1 cm (2 inches) with an area of 11.3 cm² being exposed to the test gas.

The effluent concentration of the challenge gas was monitored with a total sulfur analyzer for $H_2S$ and $SO_2$. The sulfur analyzer (Columbia Scientific, Model SA260) is a continuous emissions monitor containing a flame photometric detector. The detectors were calibrated by measuring both the compressed air stream and the challenge gas concentration with no filter in place. The progress of the breakthrough was also monitored by a chart recorder.

REAGENTS—All the reagents used in these experiments were of the best commercially available.

FILTER MEDIA—The filter mat 12 was prepared from polypropylene (PP) as a point bonded non-woven consisting of individual fibers spun in a trilobal configuration. The average fiber diameter was 32 microns with a media density of 3.0 oz/yd². The wicking fiber filters made from these mats were tested in a flat panel configuration which had a depth of 1.5 mm and a resident time of about 7.8 msec.

Examples 1–4

Impregnation of Liquid Solutions Containing Alkaline Compounds

The virgin PP trilobal filter media 12 is first soaked in an excess amount of solution of 1% solution of Dodecabenzene sulfonic sodium salt (DBS) for 5 mins and wrung to remove excess and dried at 100° C. for 20 mins. This treated filter media 12 is then cut into 2.0 inches diameter circles (weight W1) and then soaked in an excess amount of the alkaline solutions. After most of the excess amount in between is removed via careful squeezing, the circles were weighed again (W2). One set of the circles were tested for H2S removing analyses. Other set of the circles was stored in a 50% relative humidity atmosphere for 1 days (weight W3) and re-tested. The results are as shown in Table 1 and FIGS. 5A–5b.

Examples 5–6

Impregnation of Alkaline Solutions Without Surfactants

The virgin PP wicking fiber mat 12 is first cut in 2-inch diameter round testing pads (wt. W1) and then soaked and squeezed in excess amount of 20% KOH or K2CO3 solutions. (Mechanical force or heating is necessity to assist the wicking of the solution into the fiber). After excess amount of the solution were removed by squeezing, the pads had the weight of W2. The pads were then heated in a evacuating oven from 60 to 100° C. for 1 h before put into the 50% RH chamber to equilibrate overnight (wt. W3). Thus formed filters 12 were tested for H2S removing analyses. The results are in Table 1 and FIGS. 6 and 7.

TABLE 1

| Example | Solutions | Fiber wt. W1 (g) | Fiber & Solution W2 (g) | 50% RH eq. wt. W3(g) |
|---------|-----------|------------------|-------------------------|----------------------|
| 1 | 50% KOH | 0.24 | 0.97 | 0.82 |
| 2 | 50% K3PO4 | 0.21 | 1.01 | 0.96 |
| 3 | 50% K2CO3 | 0.23 | 1.04 | 0.90 |
| 4 | sat. KHCO3 | 0.23 | 1.03 | 0.44 |
| 5 | 20% KOH | 0.20 | 0.50 | 0.32 |
| 6 | 20% K2CO3 | 0.21 | 0.70 | 0.36 |

Examples 7–8

Dual Impregnation of Zn(OAc)2 and Alkaline Compounds

A virgin PP wicking fiber mat 12 (wt. WO) was first soaked in an excess amount of 13 wt % solution of Zn(OAc) 2.2H2O solution for 25 mins. After squeezing to remove excess, the mat was then dried under vacuum (18–22' of Hg) at 80° C. for a hour (wt. W1). The treated mat was then soaked and squeezed in an excess amount of 20% KOH or K2CO3 solutions for about 10 mins. After excess amounts of the solution were removed by squeezing, the mat was then dried under vacuum (18–22' of Hg) at 95–100° C. for an hour (wt. W2). The mat 12 was then cut into 2-inch diameter round pads and before put into the 50% RH chamber to equilibrate overnight (wt. W3). These formed filters 12 were tested for H2S and SO2 removing analyses. The results are as shown in Table 2 and FIGS. 6, 7, 8, 12A, 12B and 13(*c*).

TABLE 2

| Example | Fiber wt. W0(g) | divalent salt solutions | Treated wt. W1(g) | alkaline cmp. solution | Treated wt. W2(g). | Test samp. wt. W3(g) |
|---|---|---|---|---|---|---|
| 7 | 2.69 | 13% Zn(OAc)2 | 3.02 | 20% KOH | 4.42 | 0.60 |
| 8 | 3.58 | 13% Zn(OAC)2 | 4.00 | 20% K2CO3 | 5.25 | 0.42 |

Examples 9–13

Zn(OAc)2/K2CO3 Impregnation on Solid Powder Incorporated Mats

A filter mat 12 (wt. W0) was first dry impregnated with solid fine powders as disclosed in co-pending patent application (Ser. No. 08/757,984) (wt. Ws) and then impregnated with 13 wt % solution of Zn(OAc)2.2H2O solution (wt. W1) followed by 20 wt % solution of K2CO3 (wt. W2) and cut and equilibrated to 2-in diameter testing samples (wt. W3) according to the procedure in example 8. The solid samples were first ground and sieve through a 400 mesh sieve. The samples have been tested with both H2S and SO2 breakthrough tests. The results are as shown in Table 3 and FIGS. 8 and 10.

TABLE 3

| Examples | Fiber wt. W0(g) | Powder type | +Particles. wt. Ws(g) | Zn-treat. wt. W1 | Zn/K treat wt. W2 | Test samp. wt. W3 |
|---|---|---|---|---|---|---|
| 9 | 4.01 | ZnO | 4.57 | 5.62 | 8.28 | 0.74 |
| 10 | 3.44 | Al2O3 | 3.83 | 4.96 | 6.69 | 0.64 |
| 11 | 3.40 | PTFE* | 4.14 | 4.93 | 6.68 | 0.71 |
| 12 | 3.90 | NaHCO3<sup>&</sup> | 4.80 | 6.31 | 9.04 | 0.71 |
| 13 | 3.80 | Centatur Carbon | 4.37 | 6.21 | 9.90 | 0.75 |

*A few drops of 1% C4F9SO3Na solution was added in the Zn (OAc)2 solution to facilitate wicking.
<sup>&</sup>Flowing baking soda powder used for fire extinguisher containing 5% silicates.

Example 14–15

Zn(OAc)2/KOH Impregnation on Carbon Powder Incorporated Mats

A filter mat 12 (wt. W0) was first dry impregnated with Centaur or GS-1 carbon powders as disclosed in co-pending patent application (Ser. No. 08/757,984) (wt. Ws) and then impregnated with 13 wt % solution of Zn(OAc)2.2H2O solution (wt. W1) followed by 20 wt % solution of KOH (wt. W2) and cut to 2-in diameter testing samples, and then equilibrated at 50% RH(wt. W3) according to the procedure in example 7. The carbon samples was first ground and sieve through a 400 mesh sieve. The samples have been tested on H2S removals. The results are as shown in Table 4 and FIG. 12A.

TABLE 4

| Examples | Fiber wt. W0(g) | Powder type | Particles. wt. Ws(g) | Zn-treat. wt. W1 | Zn/K treat wt. W2 | Test samp. wt. W3 |
|---|---|---|---|---|---|---|
| 14 | 1.12 | Centaur | 1.26 | 1.61 | 2.20 | 0.60 |
| 15 | 1.24 | GS-1 | 1.39 | 1.83 | 2.36 | 0.49 |

Example 16–21

Various Divalent Salts Treatment on K2CO3 and Centaur Carbon Powder Incorporated Mats A filter mat 12 was first dry impregnated with 16 wt % of centaur powder as disclosed in co-pending patent application (Ser. No. 08/757,984) (wt. Wc) and then soaked into excess amount of solutions with divalent salts for 25 mins. After squeezing to remove excess, without drying, the mat (wt. W1w) was directly soaked in an excess amount of 20% K2CO3 solutions for about 10 mins. After excess amount of the solution were removed by squeezing, the mat(wt. W2w) was then dried under vacuum (18–22' of Hg) at 95–100° C. for an hour (wt. W2). The mat 12 was then cut into 2-inch diameter round pads and put into a 50% RH chamber to equilibrate overnight (wt. W3). The thus formed filters 12 were tested for H2S and SO2 removing analyses. The results are as shown in Table 5 and FIGS. 11 and 9(d).

Example 22–25

Divalent Salts /K2CO3 Treatment on Centaur Carbon Powder Incorporated Mats Without Heating A filter mat 12 was first dry impregnated with 16 wt % of centaur powder as disclosed in co-pending patent application (Ser. No. 08/757,984) (wt. Wc) and then soaked into excess amount of solutions with divalent salts for 25 mins. After squeezing to remove excess, without drying, the mat (wt. W1w) was directly soaked in an excess amount of 20% K2CO3 solutions for about 10 mins. After excess amount of the solution were removed by squeezing, the mat 12 (wt. W2w) was then cut into 2-inch diameter round pads and put into the 50% RH chamber to equilibrate overnight (wt. W3). Thus formed filters 12 were tested for H2S and SO2 removing analyses. The results are as shown in Table 5 and FIGS. 14 and 9(d).

TABLE 5

| Examples | Fiber&C wt. Wc(g) | Divalent compound | $M^2$ treat. wet. W1w(g) | $M^2$/K treat wet. W2w(g) | $M^2$/K treat dry. W2(g) | Test samp. wt. W3 |
|---|---|---|---|---|---|---|
| 16(73A) | 2.52 | — | — | 8.48 | 3.80 | 0.46 |
| 22(73B)* | 2.15 | — | — | 6.32 | — | 0.40 |
| 17(71B) | 2.43 | Zn(OAc)2 | 12.85 | 14.32 | 5.33 | 0.73 |
| 23(71A)* | 2.24 | Zn(OAc)2 | 11.89 | 13.24 | — | 0.73 |
| 18(83) | 4.62 | Zn(NO3)2 | 18.66 | 20.70 | 8.55 | 0.54 |
| 19(74) | 4.87 | Mg(OAc)2 | 18.19 | 19.60 | 7.96 | 0.51 |
| 24(72B)* | 2.49 | Mg(OAc)2 | 8.00 | 8.40 | — | 0.60 |
| 20(99-2) | 1.40 | CuSO4 | 6.60 | 6.78 | 2.78 | 0.69 |
| 21(77) | 2.94 | Mn(OAc)2 | 10.22 | 14.78 | 5.60 | 0.64 |
| 25(72A)* | 2.31 | Mn(OAc)2 | 8.18 | 11.56 | — | 0.63 |

*Without heating at all.

Example 26

Preparation of FIG. 2a Type (c) Filters

As disclosed in U.S. Pat. No. 5,344,626, five grams of commercially available centaur carbon powder (−400 mesh) were soaked for 1 hour in 10 g of an aqueous solution of 13 wt % zinc acetate dihydrate. The carbon was separated from the mixture by vacuum filtration with a Buchner funnel. The wet carbon powder was soaked further in 15 g of a 20 wt % aqueous solution of potassium carbonate. The solid was separated again by filtration through a Buchner funnel, and the solid was dried in a vacuum oven (20–25 in. Hg vacuum) at 100° C. for 3 hours (yield 5.6 g). The dried, treated carbon powder was further ground and sieved through a 400 mesh sieve and impregnated, as disclosed in co-pending patent application (Ser. No. 08/757,984), into a two inch diameter round wicking fiber pad 12 with a virgin weight of 0.220 g to an impregnated weight of 0.269 g. Thus made samples were then stored overnight at 50% relative humidity prior to the H2S and SO$_2$ breakthrough performance test. The results are as shown in FIGS. 9(c), and 13(c).

What is claimed is:

1. A filter using a fiber mat comprising:
   a plurality of elongated fibers each having a longitudinally extending internal cavity including an opening from the internal cavity to the outer fiber surface;
   active chemical reagents containing any compounds which generate alkalinity when equilibrated in air;
   an effective amount of said active chemical reagents being securely retained within the longitudinally extending internal cavities of said plurality of elongated fibers and substantially none of said active chemical reagents being present in the intra fiber voids between said plurality of elongated fibers; and
   an effective amount of solid fine powder particles also disposed within the longitudinally extending internal cavities of said plurality of elongated fibers with said active chemical reagents.

2. A filter using a fiber mat as claimed in claim 1 wherein said active chemical reagents are selected from the group consisting of Group 1 metal hydroxides, phosphates, monohydrogen phosphates, pyrophosphates, metaphosphates, carbonates, bicarbonates, borates, and combinations thereof.

3. A filter using a fiber mat as claimed in claim 1 wherein said active chemical reagents are included in a chemical reagent package which also contains an effective amount of divalent salts.

4. A filter using a fiber mat as claimed in claim 3 wherein said effective amount of divalent salts are compounds containing Group 2 and/or Group 6-12 elements in +2 oxidation state or their combinations.

5. A filter using a fiber mat as claimed in claim 1 wherein said solid fine powder particles are selected from the group consisting of carbon, zeolites, baking soda, clays, sand, cyclodextrins, aluminum oxide, silicon dioxide, and powdered ceramics.

6. A filter using a fiber mat as claimed in claim 1 wherein said effective amount of solid fine powder particles is first treated with an effective amount of said active chemical reagent and then impregnated into the longitudinally extending internal cavities of said plurality of elongated fibers.

7. A filter using a fiber mat as claimed in claim 1 wherein a plurality of internal cavities, each including an opening to the outer fiber surface, are formed in each elongated fiber.

8. A method of manufacturing fiber strands for a high performance gas removing filter; comprising the steps of:
   a. forming fiber strands each with an internal longitudinally extending cavity having a longitudinally extending opening, smaller than the cavity width, from the cavity to the fiber strand outer surface;
   b. applying a plurality of small solid particles to the strands;
   c. forcing many of the small solid particles through the longitudinally extending openings into the internal longitudinally extending cavities where they are securely retained;
   d. removing the excess of small solid particles which are not retained in the internal longitudinally extending cavities from the outer surfaces of the strands; and,
   e. impregnating the strands with active chemical reagents containing compounds which generate alkalinity when equilibrated in air.

9. A method as claimed in claim 8 including an additional step of:
   f. including with the active chemical reagents an effective amount of divalent salts.

10. An air filtration system for removing gas phase contaminants comprising:
    a plurality of fibers each having at least one longitudinally extending open channel projection into the interior of the fiber;
    active chemical reagents disposed within the open channels in said plurality of fibers to provide a reservoir of active chemical reagents in the open channels;
    a plurality of small solid particles also disposed within the open channels in said plurality of fibers with said active chemical reagents; and,
    an air flow path containing the gas phase contaminants directed over a portion of said plurality of fibers whereby said plurality of small solid particles and reservoir of active chemical reagents disposed in the open channels communicates with the air flow path and absorbs the gas phase contaminants.

11. An air filtration system for removing gas phase contaminants as claimed in claim 10 wherein the gas phase contaminants are acidic gases such as H2S and SO2 and said active chemical reagents contain compounds which generate alkalinity when equilibrated in air.

12. An air filtration system for removing gas phase contaminants as claimed in claim 10 wherein the gas phase contaminants are acidic gases such as H2S and SO2 and an effective amount of divalent salts are disposed with said active chemical reagents in the open channels.

13. A filter with improved gas phase filtration kinetics comprising:
   a plurality of elongated fibers each having a longitudinally extending internal cavity including an opening from the internal cavity to the outer fiber surface;
   a fine powder made from particles which are smaller than the opening disposed with an active chemical reagent within the internal cavities of said plurality of elongated fibers; and,
   said fine powder particles being of such a size, shape and makeup that they are securely retained within the internal cavity.

14. A filter for removing selected types of molecules from a fluid stream comprising:
   a plurality of elongated flexible fibers, each having an elongated open channel extending into the interior of the fiber, disposed to form a fiber filter mat; and,
   a plurality of solid particles and an active chemical reagent, containing compounds which generate alkalinity when equilibrated in air, which have an affinity for the selected type of molecules disposed within said elongated open channel for absorbing the selected types of molecules into said elongated open channel as the fluid stream is directed through said fiber filter mat.

15. A filter for removing selected types of molecules from a fluid stream as claimed in claim 14 whereins said active chemical reagent is selected from the group consisting of Group 1 metal hydroxides, phosphates, monohydrogen phosphates, pyrophosphates, metaphosphates, carbonates, bicarbonates, borates, and combinations thereof.

16. A filter for removing selected types of molecules from a fluid stream as claimed in claim 14 wherein a divalent salt is included with said active chemical reagent.

17. A filter for removing selected types of molecules from a fluid stream as claimed in claim 16 wherein said divalent salt is selected from compounds containing Group 2 and/or Group 6-12 elements in +2 oxidation state or their combinations.

18. A filter for removing selected types of molecules from a fluid stream as claimed in claim 14 wherein said solid particles are selected from the group consisting of carbon, zeolites, baking soda, clays, sand, cyclodextrins, aluminum oxide, silicon dioxide, and powdered ceramics.

19. A filter for removing selected types of molecules from a fluid stream as claimed in claim 18 wherein said solid particles are first treated or mixed with said active chemical reagent and then impregnated into the elongated open channels of said plurality of elongated flexible fibers.

20. A filter for removing selected types of molecules from a fluid stream as claimed in claim 14 wherein a plurality of elongated open channels, each including an opening to the outer fiber surface, are formed in each fiber.

* * * * *